United States Patent
Chorian et al.

(10) Patent No.: US 7,422,293 B2
(45) Date of Patent: Sep. 9, 2008

(54) SYSTEM AND A METHOD FOR DISSIPATING VOLTAGE IN AN ELECTRICAL CIRCUIT OF A VEHICLE

(75) Inventors: Steven Chorian, Canton, MI (US); Venkateswa Sankaran, Farmington Hills, MI (US); David Gabriel, Royal Oak, MI (US); Patrick Maguire, Ann Arbor, MI (US); Leonard Shaner, New Baltimore, MI (US); J. Anthony Lockwood, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 491 days.

(21) Appl. No.: 11/161,188

(22) Filed: Jul. 26, 2005

(65) Prior Publication Data

US 2007/0026711 A1    Feb. 1, 2007

(51) Int. Cl.
    *B60T 15/14*    (2006.01)
(52) U.S. Cl. .................... 303/20; 303/15; 340/436; 340/660
(58) Field of Classification Search ............ 303/3, 303/15, 20; 324/161–162; 340/426.11, 426.15, 340/436, 660
    See application file for complete search history.

(56) References Cited

U.S. PATENT DOCUMENTS

| | | | |
|---|---|---|---|
| 3,907,380 A * | 9/1975 | Fleischer et al. | 303/122.06 |
| 3,966,266 A * | 6/1976 | Atkins | 303/199 |
| 4,146,825 A * | 3/1979 | Harhay | 320/141 |
| 4,740,754 A * | 4/1988 | Finger | 324/428 |
| 5,291,578 A | 3/1994 | Kalami | |
| 5,304,756 A * | 4/1994 | Shimozono et al. | 200/61.45 M |
| 5,336,934 A | 8/1994 | Toepfer et al. | |
| 5,389,824 A | 2/1995 | Moroto et al. | |
| 6,433,442 B1 | 8/2002 | Maeckel et al. | |
| 6,658,355 B2 | 12/2003 | Miller et al. | |
| 6,708,095 B2 | 3/2004 | Prakah-Asante et al. | |
| 6,775,605 B2 | 8/2004 | Rao et al. | |
| 6,819,991 B2 | 11/2004 | Rao et al. | |
| 2003/0136597 A1 | 7/2003 | Raftari et al. | |
| 2007/0023215 A1 * | 2/2007 | Ueda | 180/167 |

FOREIGN PATENT DOCUMENTS

| | | |
|---|---|---|
| EP | 0 627 752 B1 | 7/1997 |
| EP | 0 628 979 B1 | 7/1997 |
| EP | 0 602 804 B1 | 7/1998 |
| EP | 1 367 617 A1 | 12/2003 |
| JP | 2002 199507 | 7/2002 |
| JP | 2003 199387 | 7/2003 |
| JP | 2004 328854 | 11/2004 |

* cited by examiner

*Primary Examiner*—Christopher P Schwartz
(74) *Attorney, Agent, or Firm*—David B. Kelley; Brooks Kushman P.C.

(57) ABSTRACT

A system and a method for dissipating voltage in an electrical circuit of a vehicle. The system includes a power source and an inverter. The power source has a voltage source and a contactor. The inverter is electrically coupled to the power source and includes a device for storing an electrical charge. The contactor is opened to disconnect the voltage source before the device is discharged.

20 Claims, 2 Drawing Sheets

SYSTEM AND A METHOD FOR DISSIPATING VOLTAGE IN AN ELECTRICAL CIRCUIT OF A VEHICLE

BACKGROUND OF THE INVENTION

1. Field of the Invention

The present invention relates to a system and a method for dissipating voltage in an electrical circuit of a vehicle, such as an electric or hybrid electric vehicle.

2. Background Art

A vehicle, such as an electric or a hybrid electric vehicle may use electrical energy for propulsion. Applicants have discovered that it is desirable to disconnect voltage sources and dissipate voltage in an electrical circuit associated with a vehicle wheel drive system under various operating conditions as described in more detail below.

SUMMARY OF THE INVENTION

In at least one embodiment, a system for dissipating voltage in an electrical circuit of a vehicle is provided. The system includes a power system, an inverter, an electrical machine adapted to drive a vehicle traction wheel, and a vehicle impact detection system. The power system includes a voltage source and a contactor. The inverter is electrically coupled to the power system and includes a device for storing an electrical charge. The vehicle impact detection system is adapted to detect a vehicle impact situation. The contactor is opened to disconnect the voltage source when a vehicle impact situation is detected and before the device is discharged with the electrical machine.

A method of dissipating voltage in an electrical circuit of a vehicle is also provided. In at least one embodiment, the method includes providing a disconnect signal, opening a contactor to disconnect a voltage source from the electrical circuit, discharging a device for storing an electrical charge at a first rate, and discharging the device at a second rate that is less than the first rate.

In at least one embodiment, the method may include providing a first signal based on the status of a vehicle impact detection system, providing a second signal based on a status of a continuity circuit, opening a contactor to disconnect a voltage source from the electrical circuit when the first signal is indicative of a vehicle impact situation or the second signal is indicative of a continuity interruption, providing a first delay, discharging a capacitor with an electrical machine, providing a second delay, and discharging the capacitor with a resistor disposed in an inverter.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
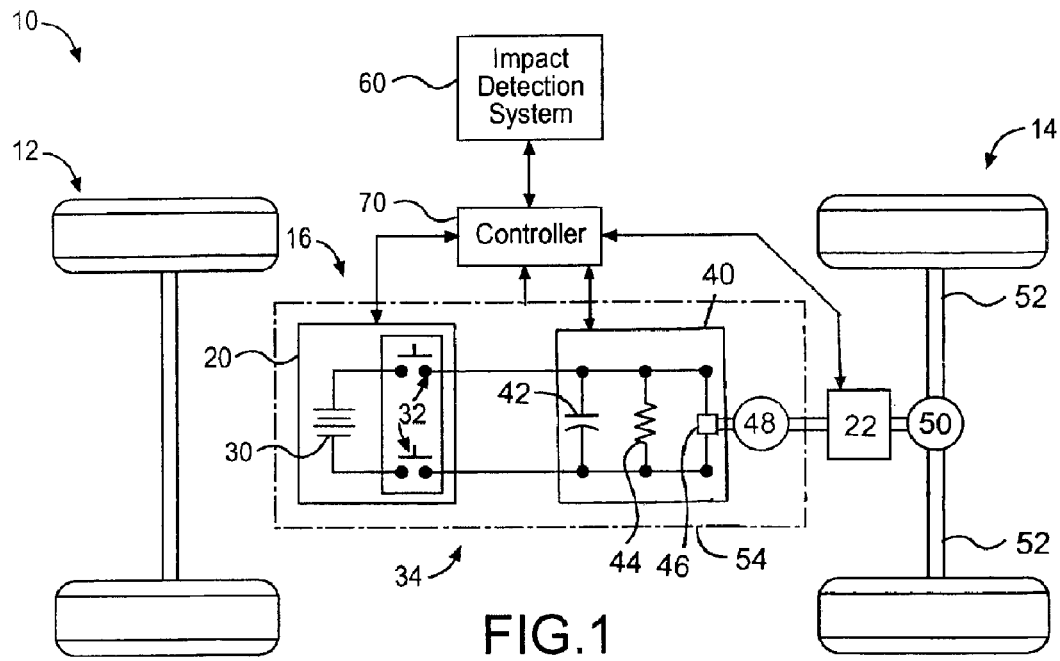
FIG. 1 is a schematic of a vehicle.

Referring to FIG. 1, a schematic of a vehicle 10 is shown. The vehicle 10 may be of any suitable type, such as an electric or hybrid electric vehicle. In at least one embodiment, the vehicle 10 may include a first wheel set 12, a second wheel set 14, and a powertrain or wheel drive system 16.

The wheel drive system 16 may be configured to provide torque to the first and/or second wheel sets 12, 14. The wheel drive system 16 may have any suitable configuration. For example, the wheel drive system 16 may include one or more power systems 20 and a power transfer unit 22. Moreover, in a hybrid electric vehicle the wheel drive system 16 may be a parallel drive, series drive, or split hybrid drive as is known by those skilled in the art.

The power system 20 may be configured to provide power for driving vehicle traction wheels or operating other vehicle components. In at least one embodiment, such as that shown in FIG. 1, the power system 20 may include a first power source 30 and one or more contactors 32. In other embodiments, such as hybrid electric vehicle embodiments, additional power systems may be provided. For instance, a second power system may be provided that has an electrical power source or non-electrical power source like an internal combustion engine.

The first power source 30 may be of any suitable type. For instance, the first power source 30 may be an electrical power source such as a battery having a plurality of electrically interconnected cells, a capacitor, or a fuel cell. If a battery is used it may be of any suitable type, such as nickel-metal hydride (Ni—MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art.

The one or more contactors 32 may be adapted to selectively connect and disconnect the first power source 30 from an electrical circuit 34. The contactors 32 may be of any suitable type and may be disposed in any suitable location, such as inside or outside a housing that contains the first power source 30.

At least a portion of the electrical circuit 34 may be associated with an inverter 40. In the embodiment shown in FIG. 1, the inverter 40 includes a device for storing an electrical charge such as a capacitor 42, a resistor 44, and one or more switching elements 46. The inverter 40 may be electrically coupled to and configured to control operation of at least one electrical machine 48.

The electrical machine 48 may be configured to be powered by one or more power sources to drive the vehicle traction wheels. The electrical machine 48 may be of any suitable type, such as a motor, motor-generator, or starter-alternator. In addition, the electrical machine 48 may be associated with a regenerative braking system for recovering energy.

The power transfer unit 22 may be selectively coupled to at least one electrical machine 48. The power transfer unit 22 may be of any suitable type, such as a multi-gear "step ratio" transmission, continuously variable transmission, or an electronic converterless transmission as is known by those skilled in the art.

The power transfer unit 22 may be adapted to drive one or more vehicle wheels. In the embodiment shown in FIG. 1, the power transfer unit 22 is connected to a differential 50 in any suitable manner, such as with a driveshaft or other mechanical device. The differential 50 may be connected to each wheel of the second wheel set 14 by a shaft 52, such as an axle or halfshaft.

The vehicle 10 may also include an interlock or continuity circuit 54. The continuity circuit 54 may detect disconnections or breaks in components associated with the electrical circuit 34. For instance, the continuity circuit 54 may include tamper switches that detect when the housing of the power system 20 is opened or sensors that detect faults or disconnections associated with various electrical components and/or high voltage connections or loads.

In addition, the vehicle 10 may include a vehicle impact detection system 60 that detects actual and/or potential vehicle impact events. The vehicle impact detection system 60 may be of any suitable type. For instance, the vehicle impact detection system 60 may be include one or more impact sensors adapted to detect a vehicle impact event. In at least one embodiment, the vehicle impact detection system 60 may include a pre-impact collision assessment system configured to detect a potential collision or impact with the vehicle 10 before it occurs. The pre-impact collision assessment system may be of any suitable type, such as radar, lidar, vision sensing-based, or combinations thereof. Exemplary pre-impact collision assessment systems are described in U.S. Pat. Nos. 6,658,355, 6,708,095, 6,775,605, and 6,819,991, assigned to the assignee of the present invention and hereby incorporated by reference in their entirety.

The vehicle 10 may also include a control system 70 for monitoring and/or controlling various aspects of the vehicle 10. The control system 70 may communicate with the one or more power systems 20, the power transfer unit 22, and/or the inverter 40 and their various components to monitor and control their operation and performance. In addition, the control system 70 may receive input signals from various components or systems, such as the continuity circuit 54, vehicle impact detection system 60, and sensors associated with the electrical circuit 34 that detect electrical attributes like voltage and/or current.

Figure 2:
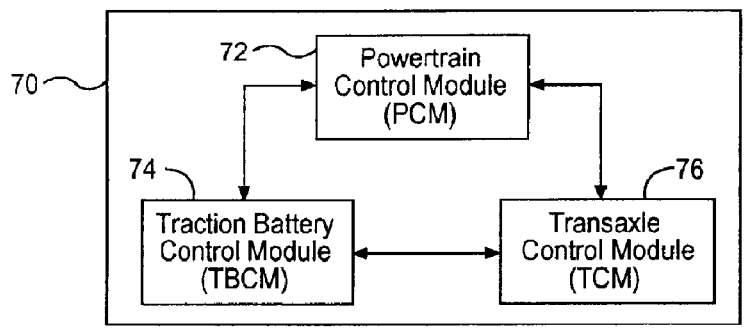
FIG. 2 is a schematic of an exemplary embodiment of a control system of the vehicle.

The control system 70 may have any suitable configuration and may include one or more controllers or control modules. In one exemplary embodiment shown in FIG. 2, the control system 70 includes a powertrain control module 72, a traction battery control module 74, and a transaxle control module 76. The control modules 72, 74, 76 may be configured to communicate with each other as indicated by the arrowed lines. In addition, each control module may be configured to communicate with and/or control various aspects of the vehicle 10. For instance, the traction battery control module 74 may monitor environmental attributes (e.g., temperature) and control the operation of one or more power sources and/or contactors 32. The transaxle control module 76 may control operation of inverter 40 to control the electrical machine 48 and the amount of torque provided to the vehicle traction wheels. In addition, one or more of the control modules 72, 74, 76 may monitor and/or respond to changed conditions detected by the continuity circuit 54 or the vehicle impact detection system 60.

Figure 3:
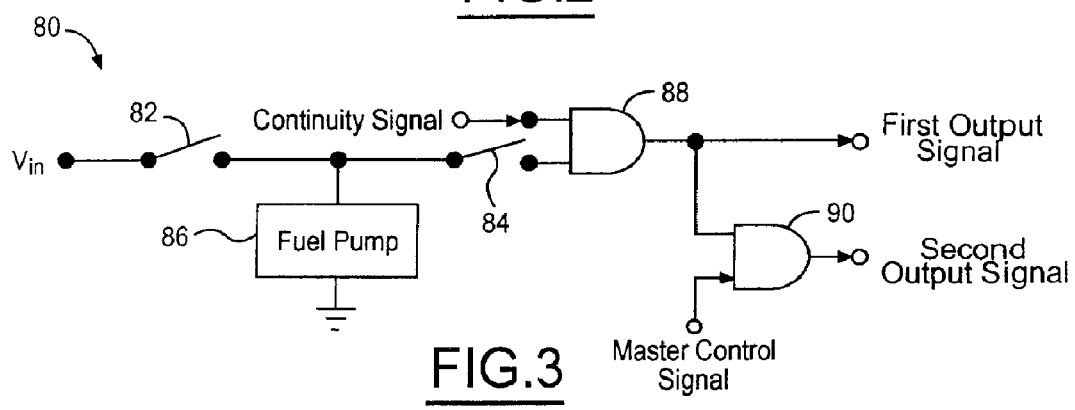
FIG. 3 is a schematic of one exemplary embodiment of a control circuit for controlling the connection of a voltage source to an electrical circuit of the vehicle.

Referring to FIG. 3, one embodiment of an exemplary control circuit 80 is shown. In this embodiment, the control circuit 80 includes a first impact sensor 82, a second impact sensor 84, a fuel pump 86. The first and second impact sensors 82, 84 may be disposed apart from each other to detect different types of vehicle impact events, such as front and rear impacts. The first and second impact sensors 82, 84, which may be inertia switches, may open when a vehicle impact event is detected. In the embodiment shown, the fuel pump 86 is disconnected from a voltage source when the first impact sensor 82 opens, thereby disabling operation of the fuel pump 86 and allowing any internal capacitors to discharge.

The control circuit 80 may also include first and second AND gates 88, 90. The first AND gate 88 may provide a first output signal when the first and second impact sensors 82, 84 are closed and a continuity signal indicative of no disconnections is provided by the continuity circuit 54. The first output signal may be used by a control module, such as the transaxle control module 76, to signal and/or synchronize changes in the operation state of the wheel drive system 16. For instance, shutdown of at least a portion of the wheel drive system 16 may be initiated when the first output signal is not present. The first output signal may also be provided to the second AND gate 90. The second AND gate 90 may also receive a master control signal from the control system 70 and generate a second output signal that is used to control the contactors 32. For instance, the contactors 32 may close when both the first output signal and the master control signal are present. As such, the contactors 32 may be disengaged when the first or second impact sensors 82, 84 are opened or the continuity signal or master control signal are not present.

Figure 4:
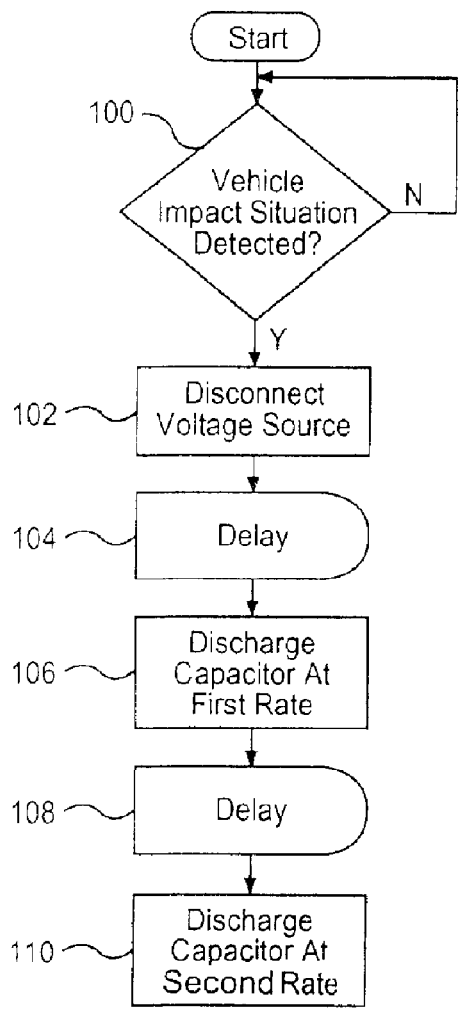
FIGS. 4 and 5 are flowcharts of methods for dissipating voltage in an electrical circuit of the vehicle.
Figure 5:
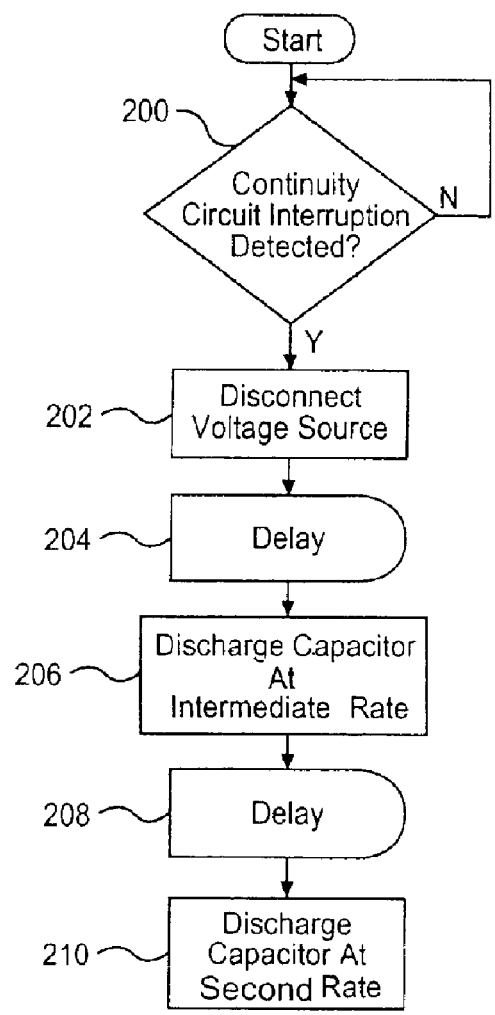

Referring to FIGS. 4 and 5, flowcharts of methods for dissipating voltage in an electrical circuit of a vehicle are shown. As will be appreciated by one of ordinary skill in the art, the flowcharts represent control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The flowcharts shown in FIGS. 4 and 5 depict steps that may be performed independently or in combination. For instance, the flowcharts in FIGS. 4 and 5 may be combined into a single flowchart.

Referring to FIG. 4, a methodology is shown that dissipates voltage in the electrical circuit 34 when a vehicle impact situation is detected.

At 100, the method begins by monitoring the vehicle impact detection system 60. If no actual or potential vehicle impact event is detected, the method continues monitoring at block 100. If an actual or potential vehicle impact event is detected, then the method continues at block 102.

At 102, a power source such as the first power source 30 is disconnected from the electrical circuit. For example, the power source may be disconnected by opening one or more contactors 32. In addition, the status of the continuity circuit may be checked and a shutdown synchronization signal may be provided to the control system 70 or a control module, such as the transaxle control module 76 to signal that additional energy dissipation steps may be taken.

At 104, a delay may be provided so that the contactors 32 have sufficient time to open and/or to permit any intermediate voltage sources, such as a capacitor associated with a fuel pump, time to discharge. The delay may be based on an elapsed period of time or changes in the electrical attributes of the circuit. In at least one embodiment, a timer may be started at block 102 to yield an elapsed time value. The delay may continue until the elapsed time value is greater than or equal to a predetermined time value. The predetermined time value may be any suitable amount, such as approximately 10 milliseconds. In other embodiments, the voltage in a portion of the electrical circuit associated with the intermediate voltage source may be employed. More specifically, the voltage in the circuit may be compared to a threshold voltage level. A delay may occur until the measured voltage is less than or equal to the threshold voltage level.

At 106, the capacitor is discharged at a first rate. The first rate may aggressively dissipate energy with the electrical machine such that the electrical machine does not provide a substantial level of output torque in a manner known by those skilled in the art. Aggressive energy dissipation may be accomplished by dumping energy to the electrical machine for a short period of time at the performance limits of the electrical machine windings, connecting cables, etc.

At 108, a second delay is provided during which the capacitor discharges at the first rate. The second delay may be based on an elapsed period of time or a threshold voltage level as described with block 104 above. The threshold time or voltage values may be the same as or different from the levels associated with block 104. For instance, if an elapsed period of time is used, the threshold amount of time may be a value greater than a time value associated with the first delay, such as approximately 100 milliseconds. In addition, a signal may be provided to the control system or a control module, such as the powertrain control module 72 that signals that the wheel drive system may be shutdown. This signal may also be used to terminate fuel delivery in an embodiment of the present invention that is equipped with fueled power source, such as an internal combustion engine or fuel cell.

At 110, the capacitor is discharged at a slow rate, designated a second rate herein. The second rate is less than the first rate and may be accomplished by providing energy from the capacitor to the resistor. In the electrical circuit embodiment shown in FIG. 1, discharging at the second rate is an inherent in the circuit due to its configuration.

Referring to FIG. 5, a methodology is shown that dissipates voltage in the electrical circuit 34 when a break or disconnection is detected by the continuity circuit 54.

At 200, the method begins by monitoring the continuity circuit 54 for a continuity interruption. An interruption may be detected if the continuity circuit voltage is less than a threshold value for a predetermined amount of time. If no interruption is detected, the method continues monitoring at block 200. If an interruption is detected, then the method continues at block 202.

At 202, a power source such as the first power source 30 is disconnected from the electrical circuit. For example, the power source may be disconnected by opening one or more contactors 32. In addition, a shutdown synchronization signal may be provided to the control system 70 or a control module, such as the transaxle control module 76 to signal that additional energy dissipation steps may be taken.

At 204, a delay may be provided so that the contactors 32 have sufficient time to open and/or to permit any intermediate voltage sources, such as a capacitor associated with the fuel pump, time to discharge. The delay may be based on an elapsed period of time or changes in the electrical attributes of the circuit. In at least one embodiment, a timer may be started at block 202 to yield an elapsed time value. The delay may continue until the elapsed time value is greater than or equal to a predetermined time value. The predetermined time value may be any suitable amount, such as approximately 10 milliseconds. In other embodiments, the voltage in a portion of the electrical circuit associated with the intermediate voltage source may be employed. More specifically, the voltage may be compared to a threshold voltage level. A delay may occur until the measured voltage value are less than or equal to the threshold voltage level.

At 206, the capacitor is discharged at an intermediate rate. The intermediate rate may be less than the first rate and greater than the second rate. Discharging at the intermediate rate may be accomplished by providing energy from the capacitor to the electrical machine at a level less than the performance limits previously described. In addition, discharging may be conducted such that the electrical machine does not provide substantial output torque in a manner known by those skilled in the art.

At 208, a second delay is provided during which the capacitor discharges at the intermediate rate. The second delay may be based on an elapsed period of time or threshold voltage level as described in block 204 above. The threshold time or voltage values may be the same as or different from the levels associated with block 204. In addition, a signal may be provided to the control system or a control module, such as the powertrain control module 72 that signals that the wheel drive system may be shutdown. This signal may also be used to terminate fuel delivery in an embodiment of the present invention that is equipped with fueled power source, such as an internal combustion engine or fuel cell.

At 210, the capacitor is discharged at the slow or second rate as described above with reference to block 110.

While the best mode for carrying out the invention has been described in detail, those familiar with the art to which this invention relates will recognize various alternative designs and embodiments for practicing the invention as defined by the following claims.

What is claimed is:

1. A system for dissipating voltage in an electrical circuit of a vehicle, the system comprising:
   a power system having a voltage source and a contactor;
   an inverter electrically coupled to the power system, the inverter including a device for storing an electrical charge;
   an electrical machine electrically coupled to the inverter and adapted to drive a vehicle traction wheel, and
   a vehicle impact detection system adapted to detect a vehicle impact situation;
   wherein the contactor is opened to disconnect the voltage source when a vehicle impact situation is detected and before the device is discharged with the electrical machine.

2. The system of claim 1 further comprising a continuity circuit associated with the power system and the inverter, the continuity circuit being adapted to detect a continuity interruption and wherein the contactor is opened to disconnect the voltage source from the inverter when the continuity interruption is detected and before the device is discharged.

3. The system of claim 2 wherein the device is discharged at a first rate with the electrical machine without producing torque when the vehicle impact situation is detected and discharged at an intermediate rate that is less than the first rate when the vehicle impact situation is not detected and the continuity interruption is detected.

4. The system of claim 3 wherein the device is discharged with the resistor at a second rate that is less than the first and intermediate rates when output voltage of the device is less than a predetermined level or a predetermined amount of time has elapsed.

5. A method of dissipating voltage in an electrical circuit of a vehicle, the method comprising:
    providing a disconnect signal;
    opening a contactor in response to the disconnect signal to disconnect a voltage source from the electrical circuit;
    discharging a device for storing an electrical charge disposed in an inverter at a first rate; and
    discharging the device at a second rate that is less than the first rate.

6. The method of claim 5 wherein the device is discharged at a first rate when a first predetermined amount of time has elapsed.

7. The method of claim 5 wherein the device is discharged at a first rate when a voltage level is greater than a voltage threshold value.

8. The method of claim 5 wherein the device is discharged at a second rate when a second predetermined amount of time as elapsed.

9. The method of claim 5 wherein the device is discharged at a second rate when a voltage level is greater than a voltage threshold value.

10. The method of claim 5 wherein the device is discharged at the first rate using an electrical machine.

11. The method of claim 10 wherein the electrical machine is a motor adapted to drive a vehicle traction wheel and the device is discharged such that motor does not produce sufficient torque to propel the vehicle.

12. The method of claim 5 wherein the disconnect signal is based on a continuity signal from a continuity circuit.

13. The method of claim 5 wherein the disconnect signal is provided when a vehicle impact situation is detected.

14. The method of claim 13 wherein the step determining whether a vehicle impact situation is detected is based on a signal from a precollision detection system.

15. The method of claim 13 wherein the step of determining whether a vehicle impact situation is detected is based on a signal from a vehicle impact sensor.

16. A method of dissipating voltage in an electrical circuit of a vehicle, the method comprising:
    providing a first signal based on the status of a vehicle impact detection system;
    providing a second signal based on a status of a continuity circuit;
    opening a contactor to disconnect a voltage source from the electrical circuit when the first signal is indicative of a vehicle impact situation or the second signal is indicative of a continuity interruption;
    providing a first delay;
    discharging a capacitor disposed in an inverter with an electrical machine adapted to drive vehicle traction wheels;
    providing a second delay; and
    discharging the capacitor with a resistor disposed in the inverter.

17. The method of claim 16 wherein the electrical machine is a motor adapted to drive a vehicle traction wheel and the step of discharging the capacitor with the electrical machine does not produce motor torque.

18. The method of claim 16 wherein the capacitor is discharged with the electrical machine at a first rate when the first signal is indicative of a vehicle impact situation and discharged at an intermediate rate when the first signal is not indicative of a vehicle impact situation and the second signal is indicative of a continuity interruption.

19. The method of claim 18 wherein the first rate is greater than the intermediate rate.

20. The method of claim 18 wherein the capacitor is discharged with the resistor at a second rate that is less than the first and intermediate rates.

* * * * *